April 29, 1952  J. BLUE  2,594,284
LIQUID FERTILIZER APPLYING APPARATUS
Filed Dec. 21, 1948  2 SHEETS—SHEET 1
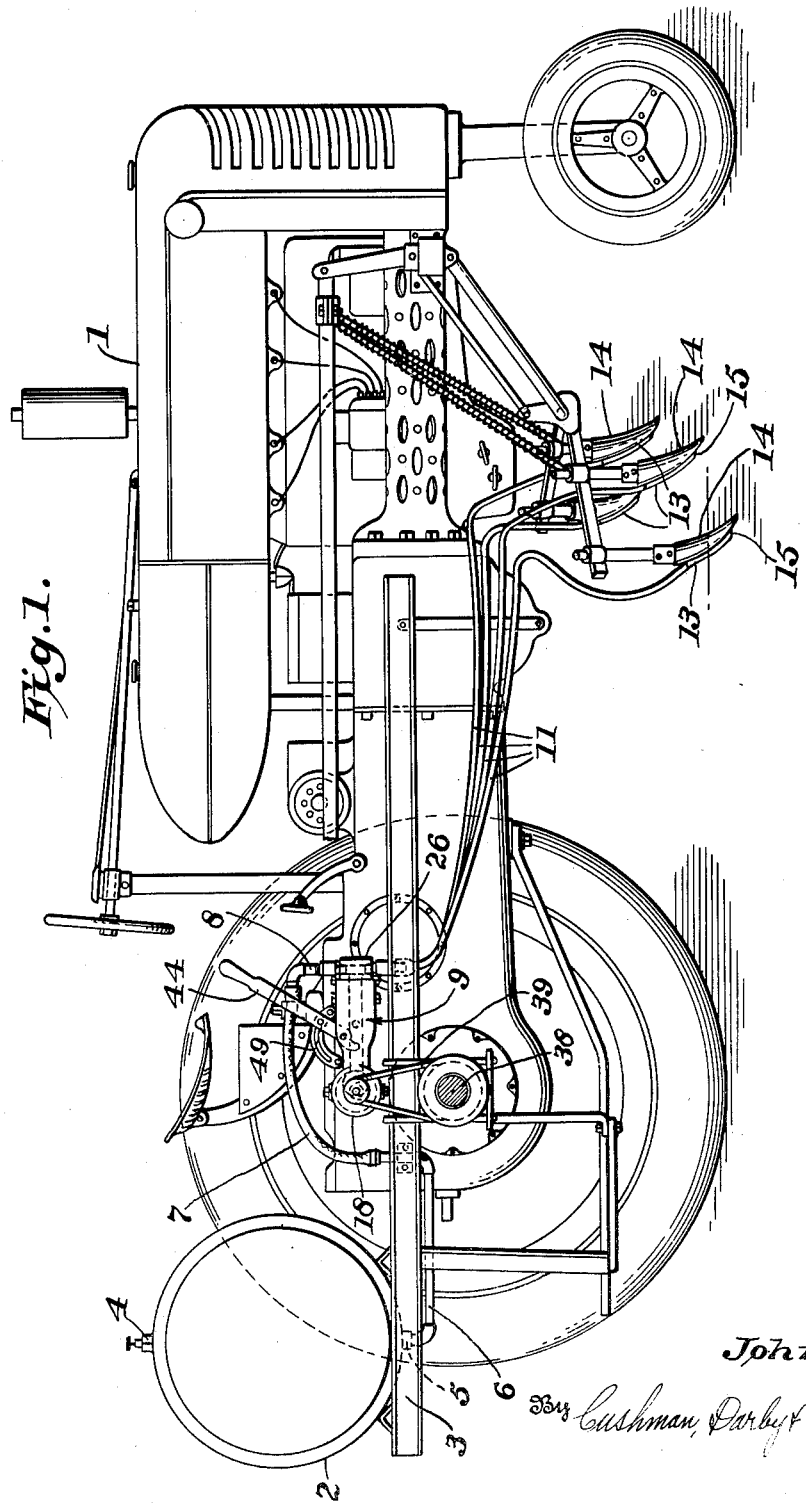
Inventor:
John Blue,
By Cushman, Darby & Cushman
ATTORNEYS

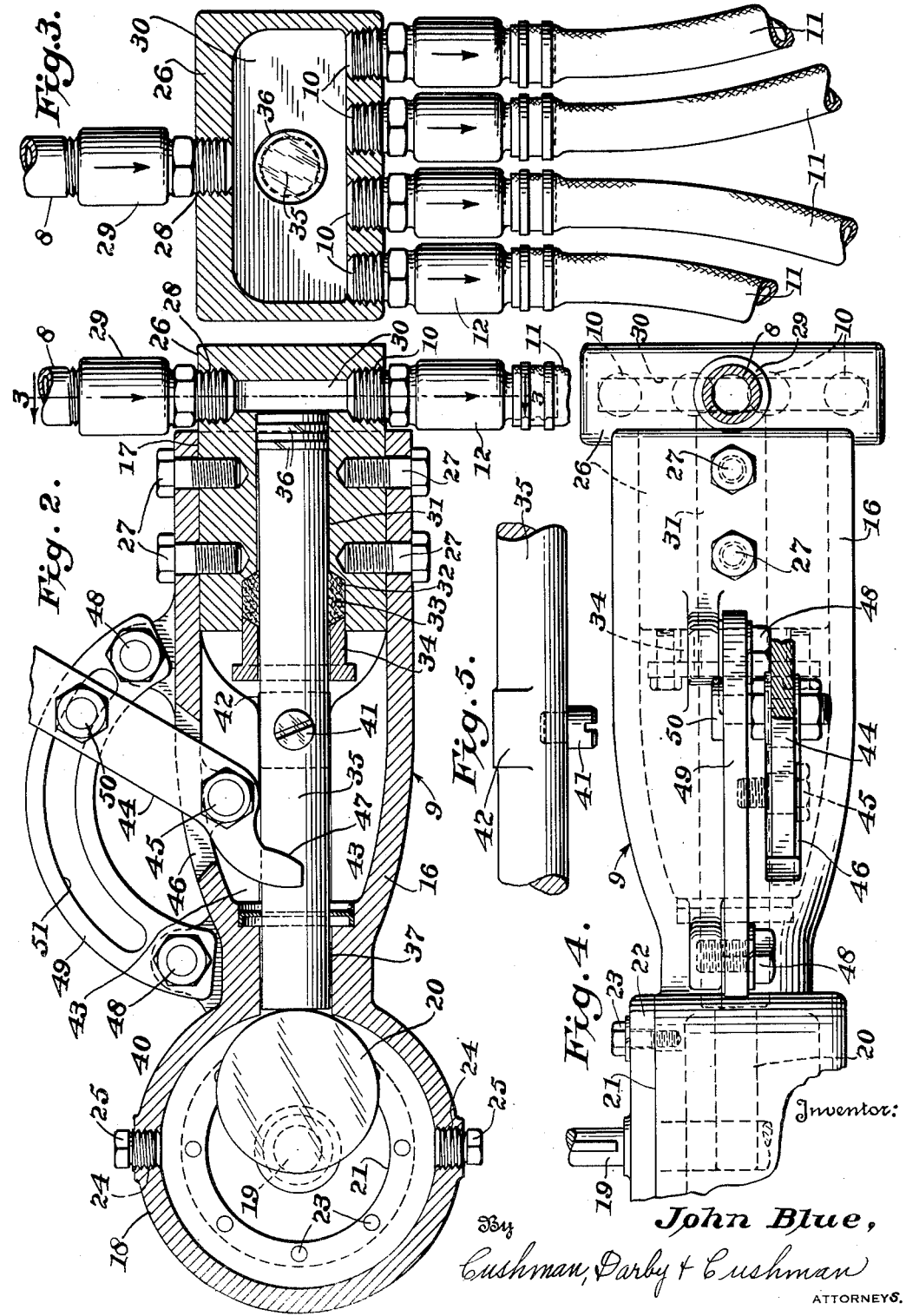

Patented Apr. 29, 1952

2,594,284

UNITED STATES PATENT OFFICE 2,594,284

LIQUID FERTILIZER APPLYING APPARATUS

John Blue, Huntsville, Ala., assignor to John Blue Company, Huntsville, Ala., a corporation of Alabama Application December 21, 1948, Serial No. 66,482

4 Claims. (Cl. 103—38)

The present invention relates to easily vaporizable liquid fertilizer applying apparatus, and, more particularly, to apparatus for distributing such fertilizers to the soil in amounts varying with the forward speed of the vehicle to which the apparatus is attached.

In the large scale spreading of liquid fertilizers, one of the principal disadvantages has been the failure of available apparatus to control the quantity of fertilizer distributed in accordance with the forward speed of the fertilizing machine. Because the speed of the distributing machine must necessarily vary, uneven distribution and great waste of fertilizer has resulted. Accordingly, it is an object of this invention to overcome these disadvantages by providing an apparatus for applying easily vaporizable liquid fertilizers to the soil in amounts which vary with the speed of the distributing vehicle.

It is also a more specific object of this invention to provide an apparatus which will not only provide an amount of fertilizer varying in accordance with the forward speed of the vehicle employed, but one which will also provide an adjustable amount of fertilizer distribution at a particular speed.

A still further object is the provision of a new form of a variable delivery pump.

These and other objects will appear more clearly from the accompanying drawings in which:

Fig. 1 represents a side elevation of the distributing apparatus as applied to a garden tractor.

Fig. 2 represents a central vertical section of the variable delivery pumping device.

Fig. 3 represents a transverse section of the device taken on the line 3—3 of Fig. 2.

Fig. 4 represents a top plan view of the device.

Fig. 5 represents a detailed plan view of the piston used in the pumping device with the ends broken away.

Referring now to the drawings for a more complete understanding of my invention, a conventional garden tractor is represented at 1. A liquid fertilizer tank 2 is supported at the rear end of the tractor by suitable braces 3 which are fixed to the tractor body in any suitable manner. A vapor bleed-off valve 4 is located at the top of the fertilizer tank while at the bottom of the tank is a fluid outlet 5. Fitted into this outlet in any well known manner is a pipe 6 to the end of which a flexible conduit 7 is connected. The other end of this conduit is joined to the inlet pipe 8 of the variable delivery pump 9 which is also supported on the tractor by the braces 3. The specific details of the pump will appear in a later section of this specification. At the present, however, it will suffice to say that the pump is provided with a plurality of threaded outlets 10, as clearly seen in Fig. 3. Fluid conduits 11 joined to these outlets through suitable connectors 12 extend downwardly from the pump and are fixed to the top portions of hollow tubular members 13 attached to the cultivating members 14. These tubular members are welded onto the rear portions of the cultivating members and are provided with liquid outlet openings 15 at their lower ends for placing the fertilizer into the worked soil.

Turning now to Figures 2 through 5 for a detailed description of the pump 9, I designate the casing proper by the numeral 16. This elongated casing is provided at one end with an open rectangular end portion 17 and at the other end with a cylindrical housing portion 18. Within the housing portion is a rotatable driven shaft 19 (see Fig. 4) provided with a cam 20. In order to enable an operator to readily clean or repair any of the parts within the housing, there is provided an open side 21 which is closed by a readily removable metallic cover plate 22 fitting over the shaft 19 and fixed by bolts 23 to the casing. The interior of the housing is supplied with a suitable amount of oil through an opening 24 closed by a screw bolt 25 on the top surface of the housing while for draining purposes a similar opening is provided on its bottom surface.

At the other end of the casing is a cylinder block 26 fixed partially within the open end 17 of the casing by bolts 27. In the upper surface of the cylinder block which extends beyond the casing is a threaded fluid inlet 28 to which the previously mentioned pipe inlet 8 is joined through a suitable coupling or connector 29. Directly below the fluid inlet 28 on the lower surface of the cylinder block are the threaded fluid pressure outlets 10 mentioned above. Placing the block inlet and outlets in direct communication with each other is a fluid pressure space 30. In order to provide against undesirable backward flow through either the inlet or outlets, I provide check valves, not shown, within the connector members 29 and 12, respectively.

Perpendicular to and communicating with the fluid pressure space 30 is a cylinder 31 extending through the entire length of the cylinder block within the casing. That end of the cylinder which is farthest from the fluid space 30 is cut away as at 32 to provide a seat for suitable packing material 33 and a packing nut 34. Slidably fitted within this cylinder is one end of a piston rod 35 having suitable split rings 36 for preventing fluid leakage between the cylinder walls and the piston rod. The other end of the piston 35 fits slidably into a restricted portion 37 within the casing. This end of the piston is so placed as to be intermittently pushed by the rotating cam 20. The pushing of the cam 20 causes the piston to slide through the cylinder, thereby creating a pumping effect on the liquid within the cylinder 31 and fluid space 30. Figure 2 shows the cam and piston positions just at the end of the pumping stroke. The cam 20 is rotated at a speed variable with the speed of the tractor by connecting its rotatable shaft to the rear drive shaft 38 of the tractor by means of a belt 39. Suitable packing 40 prevents leakage between the surface of the piston rod and the casing.

As shown more clearly in Figure 5, the surface of the piston 35 is provided with an abutment pin 41 and a raised block portion 42. The block portion is adapted to prevent possible rotation of the piston during its movement through cooperation with the guide members 43.

For limiting the backward stroke of the piston and also for providing means for varying pump output at a given speed, I provide a hand lever 44 pivotally fixed to the casing by a bolt 45. The upper portion of the lever extends upwardly through a slot 46 in the casing surface while the lower portion extends downwardly into the casing and is provided with a curved surface 47 adapted to contact the pin 41. Fixed to the outside casing surface by bolts 48 is an arcuately shaped metallic member 49 by means of which adjustments of the lever may be made. These adjustments are made by providing an adjustable bolt 50 on the lever which is slidable in a slot 51 of the arcuate member 49. In this manner, the lower portion of the lever may be adjusted relative to the pin abutment for any desired distance by simply operating the lever. By tightening the bolt 50 the lever's position may be left fixed in any desired position.

The operation of my device is now probably quite apparent. For illustrative purposes, it is assumed that the easily vaporizable liquid fertilizer employed is anhydrous ammonia, which is under a relatively high pressure when stored, although it should be understood that any similar liquid fertilizers that are under high pressure will operate in the same manner.

Assuming the tractor to be moving, liquid ammonia is admitted to the pump inlet 28 from the tank 2 through the pipe 6 and conduit 7. Since the rotatable shaft 19 is driven by the tractor drive shaft, the cam 20 will rotate at a speed variable with the speed of the tractor drive shaft, and, consequently, its speed will vary with that of the tractor. The cam, as it rotates, intermittently pushes the piston rod 35 through the cylinder 31. The force of the piston sliding through the cylinder produces a pumping effect on the ammonia within the cylinder block and forces this fluid out through the pressure outlets 10, the conduits 11 and the tubular members 13 into the worked soil. After its pumping stroke, the piston is forced backwards into position to be pushed again by the cam due to the pressure of the fluid coming into the cylinder block through the inlet 28. The backward stroke of the piston is limited by contact of the pin 41 with the lever portion 47. In order to vary the backward stroke and, obviously, the amount of ammonia pumped at a particular speed, the lever may be adjusted by the adjusting bolt 50. It is preferred to add check valves in the pump inlet 29 and outlet connectors 12 in order to prevent undesirable backward flow during operation of the pump.

It, of course, is obvious from the above that the faster the tractor is operated, the faster is the rotation of the cam 20 and, consequently, the greater the amount of ammonia pumped out to the soil through the cultivating members. It is also no doubt apparent that by providing the lever adjustment, I have at the same time devised means for varying the pumping stroke and accordingly have obtained an apparatus which can be adjusted for pumping varying amounts of ammonia at the same tractor speed.

It is to be understood that various changes in the shapes and materials I have employed can be made without deviating from the scope of this invention. I am also aware that other easily vaporizable liquid fertilizers than ammonia can be used with equal success in my apparatus.

Having thus described my invention, what I claim as new is:

1. A variable delivery pump for easily vaporizable liquid fertilizer and the like adapted for attachment to a vehicle whereby the easily vaporizable liquid is discharged therefrom in a quantity dependent upon the speed of the vehicle, said variable delivery pump comprising a casing having an open end, a cylinder block fitted into said open end, said cylinder block having a liquid inlet and liquid outlet and a liquid pressure space therebetween, a cylinder within said cylinder block communicating with said liquid pressure space, a piston within said casing and slidably mounted within said cylinder, cam means positioned to intermittently push said piston further into said cylinder at a rate dependent on the speed of the vehicle to which said pump is attached whereby a pumping stroke is effected to discharge liquid from within said liquid pressure space through said liquid outlet, said piston, after the pumping stroke, being adapted to be returned to a position where the pumping stroke may again be effected by said cam means by means of liquid entering said liquid pressure space through said liquid inlet, and means on said casing cooperating with said piston for adjusting the stroke of the latter.

2. A variable delivery pump for easily vaporizable liquid fertilizer and the like adapted for attachment to a vehicle whereby the easily vaporizable liquid is discharged therefrom in a quantity dependent upon the speed of the vehicle, said variable delivery pump comprising a casing having an open end and a housing end, a cylinder block fitted into said open end, said cylinder block having a liquid inlet and a plurality of liquid outlets and a liquid pressure space therebetween, a cylinder within said cylinder block communicating with said liquid pressure space, a piston within said casing having stop means on its surface, one end of said piston being slidably carried in said cylinder, a shaft within said housing end adapted to be rotated at a rate dependent upon the speed of the vehicle to which said pump is attached, cam means mounted on said rotatable shaft positioned to intermittently push said piston further into said cylinder whereby a pumping stroke is effected to discharge liquid from within said liquid pressure space through said liquid outlets, said piston, after the pumping stroke, being adapted to be returned to a position where the pumping stroke may again be effected by said cam means by means of liquid entering said liquid pressure space through said liquid inlet, and adjustable means on said casing cooperating with said piston stop means to limit the return of said piston whereby the rate of discharge for a particular speed of the vehicle may be adjusted, said adjustable means comprising a lever pivotally fixed to said casing, a portion of said lever extending into said casing for contact with said piston stop means.

3. A system for distributing easily vaporizable liquid fertilizers and the like to the soil from a vehicle at a rate dependent upon the speed of the vehicle, which comprises a supply tank for the liquid to be distributed, a variable delivery pump for said liquid, said variable delivery pump comprising a casing having a liquid inlet and outlet and a liquid pressure space therebetween, a piston slidable within said casing in communication with said liquid pressure space, and cam means positioned to intermittently push said piston lengthwise of said casing at a rate dependent on the speed of the vehicle to which said pump is attached whereby a pumping stroke is effected to discharge liquid from within said liquid pressure space through said liquid outlet, said piston, after the pumping stroke, being returned to a position where the pumping stroke may again be effected by said cam means by means of liquid entering said liquid pressure space through said liquid inlet, conduit means connecting said tank to the inlet of said pump and means for conducting liquid from said pump outlet to the soil.

4. A system for distributing easily vaporizable liquid fertilizers and the like to the soil from a vehicle at a rate dependent upon the speed of the vehicle, which comprises a supply tank for the liquid to be distributed, a variable delivery pump, said variable delivery pump comprising a casing having an open end and a housing end, a cylinder block fitted into said open end, said cylinder block having a liquid inlet and a plurality of liquid outlets and a liquid pressure space therebetween, a cylinder within said cylinder block communicating with said liquid pressure space, a piston within said casing having stop means on its surface, one end of said piston being slidably carried in said cylinder, a shaft within said housing end adapted to be rotated at a rate dependent upon the speed of the vehicle to which said pump is attached, cam means mounted on said rotatable shaft positioned to intermittently push said piston further into said cylinder whereby a pumping stroke is effected to discharge liquid from within said liquid pressure space through said liquid outlets, said piston, after the pumping stroke, being adapted to be returned to a position where the pumping stroke may again be effected by said cam means by means of liquid entering said liquid pressure space through said liquid inlet, and adjustable means on said casing cooperating with said piston stop means to limit the return of said piston whereby the rate of discharge for a particular speed of the vehicle may be adjusted, said adjustable means comprising a lever pivotally fixed to said casing, a portion of said lever extending into said casing for contact with said piston stop means, conduit means connecting said tank to the inlet of said pump and means for conducting liquid from said pump outlets to the soil.

JOHN BLUE.

REFERENCES CITED

The following references are of record in the file of this patent:

UNITED STATES PATENTS

| Number | Name | Date |
| --- | --- | --- |
| 569,883 | Ollard | Oct. 20, 1896 |
| 2,029,941 | Pakorney | Feb. 4, 1936 |
| 2,148,112 | Dillstrom | Feb. 21, 1939 |
| 2,272,300 | Johnston | Feb. 10, 1942 |
| 2,309,074 | Edwards | Jan. 19, 1943 |
| 2,394,668 | Davidson | Feb. 12, 1946 |
| 2,407,343 | Pyne et al. | Sept. 10, 1946 |